(No Model.)
H. HUNTSMAN.
PLOW JOINTER.
No. 259,861. Patented June 20, 1882.
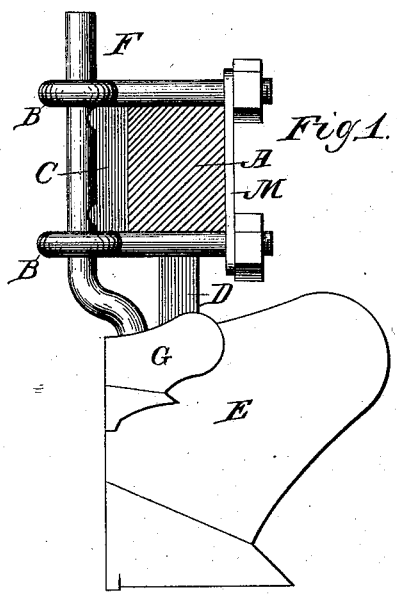
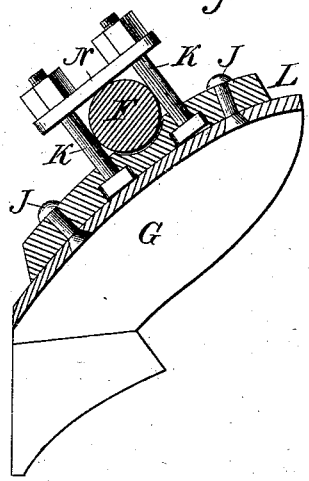
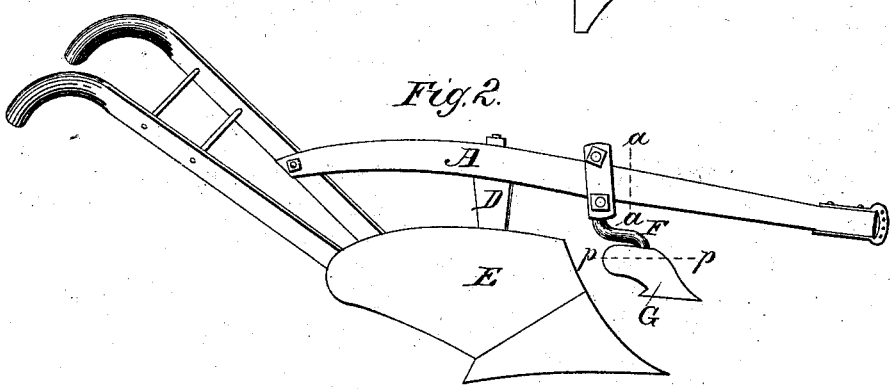
Witnesses.
Frank A. Brown
Albert E. Redstone
Inventor.
Horace Huntsman
pr John H. Redstone
Atty

UNITED STATES PATENT OFFICE.

HORACE HUNTSMAN, OF SACRAMENTO, CALIFORNIA.

PLOW-JOINTER.

SPECIFICATION forming part of Letters Patent No. 259,861, dated June 20, 1882.

Application filed January 3, 1882. (No model.)

*To all whom it may concern:*

Be it known that I, HORACE HUNTSMAN, a citizen of the United States, residing at Sacramento, in the county of Sacramento and State of California, have invented a certain new and useful Improvement in Plow-Jointers, of which the following is a specification, reference being had to the accompanying drawings, and the letters marked thereon.

Figure 1 is a front elevation of the plow, showing a transverse section of the plow-beam through the dotted lines *a a* shown in Fig. 2. Fig. 2 is a perspective view, showing the arrangement of my improvement. Fig. 3 is an enlarged section, showing the jointer cut through the dotted lines *p p* in Fig. 2.

A represents the plow-beam; B, the eyebolts; C, the bed-plate upon which the jointer-standard is attached to the plow-beam; D, the plow-standard; E, the plow mold-board; F, the adjustable jointer-shank; G, the jointer mold-board; J, the jointer bed-plate rivets; K, the jointer set-bolts; L, the jointer-connecting bed-plate; M and N, washer-plates.

My invention relates to the arrangement and attachment of plow-jointers, and the principal object is to provide a secure and ready adjustment to any required position. The following is the operation of the same:

The jointer-standard F, having its bearing on the bed-plate C and adjusted at the required angle against the side of the plow-beam A, and at the required elevation, and revolved to bring the jointer in proper line with the plow, then the eyebolts B are firmly set, holding the jointer-standard immovable. Then the jointer mold-board is revolved upon the jointer-standard F to bring the point of the jointer in line with the shin and point of the plow. It is then set fast by tightening the set-bolts K, thus affording every required adjustment and securing the utmost convenience. The whole is then ready to work, and as the plow moves forward the jointer, cutting from two and one-half to four inches in depth, cuts under the roots of the weeds, straw, or other vegetation, throwing the same in a steady stream over into the furrow, and as the furrow is turned over it covers the same completely, as is well known by those conversant with the use of the plow-jointer.

Having thus described my invention, what I claim and desire to secure by Letters Patent, is—

The combination of the crank-standard F, the jointer mold-board G, the bed-plate L, rivets J, clamping-bolts K, and plate N, substantially as shown and described.

HORACE HUNTSMAN.

Witnesses:
JOHN H. REDSTONE,
FRANK R. BRAUN.